United States Patent
Harm

(10) Patent No.: US 8,332,878 B2
(45) Date of Patent: Dec. 11, 2012

(54) USER SCRIPTABLE SERVER INITIATED USER INTERFACE CREATION

(75) Inventor: Michael W. Harm, New York, NY (US)

(73) Assignee: Google Inc., Mountainview, CA (US)

( * ) Notice: Subject to any disclaimer, the term of this patent is extended or adjusted under 35 U.S.C. 154(b) by 0 days.

(21) Appl. No.: 13/353,049

(22) Filed: Jan. 18, 2012

(65) Prior Publication Data
US 2012/0144300 A1 Jun. 7, 2012

Related U.S. Application Data

(63) Continuation of application No. 12/949,520, filed on Nov. 18, 2010.

(51) Int. Cl.
*G06F 3/00* (2006.01)
(52) U.S. Cl. .................... 719/328; 719/318
(58) Field of Classification Search .......... 719/318, 719/328; 715/704
See application file for complete search history.

(56) References Cited

U.S. PATENT DOCUMENTS

| | | | |
|---|---|---|---|
| 4,935,870 A | 6/1990 | Burk et al. | |
| 5,666,500 A * | 9/1997 | Roberson | 715/826 |
| 6,823,522 B1 * | 11/2004 | Lamb | 719/316 |
| 7,831,660 B2 * | 11/2010 | Park | 709/203 |
| 2002/0082988 A1 | 6/2002 | Ujiie et al. | |
| 2004/0163073 A1 | 8/2004 | Krzyzanowski et al. | |
| 2005/0286366 A1 * | 12/2005 | Okamoto | 369/47.5 |
| 2007/0250405 A1 | 10/2007 | Ronen et al. | |
| 2008/0172219 A1 | 7/2008 | Thomas | |
| 2011/0151838 A1 * | 6/2011 | Olincy et al. | 455/412.1 |

FOREIGN PATENT DOCUMENTS

| | | |
|---|---|---|
| KR | 10-0340253 | 6/2002 |
| WO | WO01/28186 | 4/2001 |

OTHER PUBLICATIONS

Oak Ridge, Intergrated PVM Framework Supports Hetergeneus Network Computing, Jan. 3, 1993.*
International Search Report and Witten Opinion in international application No. PCT/US2010/057236, dated Sep. 23, 2011, 10 pages.

* cited by examiner

*Primary Examiner* — Lechi Truong

(57) ABSTRACT

A computer-implemented method of providing user interfaces in association with network hosted computer scripts is disclosed. A group of selectable user interface elements is provided to a macro author. The elements include behavior that, when controls generated by the elements are selected by a computing device user, cause a web-connected server separate from the computing device to perform one or more operations. A selection by the macro author of a user interface element and an identification of one or more parameters for the element is received. Macro code to generate controls associated with the author-selected elements to be associated with a first macro is executed, the first macro stored to be called from and execute on computing devices different from the device used by the macro author. The macro code is stored and the generated macro code is provided for access by users of a hosted computer system.

20 Claims, 6 Drawing Sheets

USER SCRIPTABLE SERVER INITIATED USER INTERFACE CREATION

CROSS-REFERENCE TO RELATED APPLICATIONS

This application is a continuation of: U.S. patent application Ser. No. 12/949,520, filed Nov. 18, 2010. The disclosure of the prior application is considered part of (and are incorporated by reference in) the disclosure of this application.

TECHNICAL FIELD

This document relates to network-based delivery of electronic content

BACKGROUND

A macro is a set of instructions that can be executed inside one or more computer applications to provide enhanced and automatic interactivity with those applications, where at least part of the macro represents steps that could otherwise be taken manually by a user of an application. For example, a macro could be written so as to compute a value from certain numbers in a spreadsheet application and copy the value to a related word processing application on a desktop computer. A user could assign a "hot key" combination to the macro so that the macro can be run easily by the user simply by pressing the hot key combination. As another example, a macro could also be written to cause certain electronic messages (e.g., those from a spouse, client, or boss) to be elevated in importance so that they can be more easily seen by a user of a computing device. In some implementations, macros can provide simple user interfaces that can be used to prompt a user to enter information. The user can use the user interface to submit information for use by the macro. The submitted information can be used, for example, to populate fields of a spread sheet. One familiar macro-based system is Visual Basic for Applications.

SUMMARY

This document discusses systems and techniques for creating and presenting user interfaces in association with various scripts (e.g., macros) in a hosted computing environment, often referenced colloquially as "the cloud." The scripts may be stored and executed from a script server sub-system, rather than from a client device, thus allowing the scripts to be shared easily between users, because all qualified users may access the scripts from any location as long as they can access the network and can provide their credentials. The user interfaces can be defined using familiar, high level programmatic objects. For example, dialogs, submission buttons, radio selection buttons, check boxes, text input areas, and other user interface features can be readily provided within a user interface based on a command language. The user interfaces can provide for flexible layouts (e.g., vertical pane, grid, flow, or other layouts).

The user interfaces can be rendered on a variety of output devices, including within web browsers displayed by personal computers, mobile computing devices, and other computing devices. Furthermore, the scripts can allow for the definition of callbacks in response to known events (e.g., button click, value change, check box selection, etc.). The callbacks can result in an action being performed by the server or by the client device. In some implementations, a callback can result in the server sending commands to the client device that cause the user interface to be altered. For example, specified controls can be disabled based on a particular user input or other event.

In addition, the scripts may readily access a number of applications and services, including services that provide information about locations of various users (as determined, e.g., from GPS on their mobile devices), services that provide news and weather feeds, and other such services. The applications can vary widely, and may include email, productivity applications such as spreadsheets and word processors, mapping applications, and mash-ups of various applications that may be presented together on a single web page (which may be accessed by a user and even developed by the user to provide customized output from a script).

Certain scripts may be invoked from events that occur even when a user is not interacting with an application that is addressed by the particular scripts. In particular, when the script is stored and executed on a server sub-system, the server sub-system may be established to monitor for particular events in the overall system that are directed to the script. Such events may then trigger the invocation of the script, and the script may execute on the server sub-system. The script may access services on the system or third-party services. Services on the system may grant access to data stores that correspond to a particular user who is registered with the system. For example, a script may be invoked in response to an electronic mail message coming into a user's account, and may in turn copy information from the message into a spreadsheet that is assigned to the user's account (e.g., so that the user may automatically compile a spreadsheet that shows subject lines from all of their incoming messages). Third-party services may include SOAP services or other similar services that may be accessed from a domain that is separate from the domain that provides the services, and that provide a well-known mechanism for sharing information over the Internet. For example, a third-party service provider may compile up-to-date weather data and may make the data available to other services upon request.

In a first aspect, a computer-implemented method of managing computer macros includes providing to a macro author, with a computer system, a group of selectable user interface elements. The elements include behavior that, when controls generated by the elements are selected by a user of a computing device, cause a web-connected server that is separate from the computing device to perform one or more defined operations. The method also includes receiving a selection by the macro author of one of the selectable user interface elements, and an identification of one or more parameters for the author-selected element. The method further includes causing, by the computer system, macro code to cause generation of controls associated with the author-selected elements to be associated with a first macro, the first macro stored to be called from and execute on computing devices other than a device used by the macro author, and storing the macro code and making the generated macro code available for access by users of a hosted computer system other than the macro author.

Implementations can include any, all or none of the following features. The method may further include associating the first macro with the macro author using a registered user account of the macro author, and making the macro code available to other users of the hosted computer system according to access restrictions identified by the macro author. The access restrictions may be defined by one or more groups of users registered with the hosted computer system. The method may further include receiving requests to execute the macro code from a plurality of different applications running on a plurality of different client computers remote from the hosted computer system, automatically executing the macro code on the hosted computer system for each of the requests, and providing results of executing the macro code to each respective application of the plurality of applications in response to executing the macro. Particular ones of the different client computers may be registered to different accounts for different users, and the plurality of different applications may correspond to a plurality of different registered users. Executing the macro code may include making calls to multiple different hosted services provided by the hosted computer system, or making calls to web services provided by third-party information providers that are independent of the hosted computer system. The method may further include translating information generated by a first application running on the hosted computer system to a different format and providing the translated information to a second application running on the hosted computer system, or automatically providing the results of executing the macro code to a plurality of different accounts for a plurality of different users who are registered with the hosted computer system. The selectable user interface elements may be selected from a group consisting of dialog boxes, buttons, radio buttons, TextArea objects, user interface layout definitions, and forms.

In another aspect, a computer-implemented method of managing computer macros includes storing macro code generated by a macro author at a location in an internet-accessible hosted computer system, where the code was generated by the macro author by way of selection of user interface elements from a group of user interface elements and definition by the macro author of parameters for the selected user interface elements. The method also includes receiving a request, from an application that is running on a client computer remote from the hosted computer, to execute the macro code, and executing the macro code on the hosted computer system. The method further includes providing results of executing the macro code to the application that is running on the client computer, where macro code is stored and accessed apart from files on which the macro code is programmed to operate.

Implementations can include any, all or none of the following features. The method may also include determining whether a user associated with the application running on the client computing device is authorized to access the macro code, by determining whether the macro author included an account for the user as an account authorized to access the code. The method may also include receiving requests to execute the macro code from a plurality of different applications running on a plurality of different client computers remote from the hosted computer system, automatically executing the macro code on the hosted computer system for each of the requests, and providing results of executing the macro code to each respective application of the plurality of applications in response to executing the macro. Executing the macro code on the hosted computer system may include executing a portion of the macro code on the hosted computer system and a portion of the macro code on the client computing device. The user interface elements may be selected by the macro author from a group consisting of dialog boxes, buttons, radio buttons, TextArea objects, user interface layout definitions, and forms.

In another aspect, a computer-implemented system for executing macros on a hosted computer system includes a plurality of hosted applications executable on the hosted computer system, and a macro authoring application programmed to present to macro authors one or more groups of user interface elements for selection by the macro authors, and whose selection causes code for generating a selected user interface element to be added automatically to a macro authored by a respective macro author. The system also includes a macro data store storing a plurality of macros that are each assigned to a user account on the hosted computer system and that each define a series of actions to be executed by at least one of the plurality of hosted applications, where access to the plurality of macros is defined so as to identify user accounts on behalf of which the system will execute each of the plurality of macros. The system further includes a computer server programmed to run a script manager that accesses a macro in response to an execution request and executes the macro by gathering information from one or more network-accessible services to which a user account has access.

Implementations can include any, all or none of the following features. The stored macros may be accessible from applications operated on behalf of one or more user accounts other than the user account to which the macros are assigned. The script manager may be programmed to selectively permit access to the macros to user accounts that are identified as having access to each particular macro of the macros. The macro authoring application may be programmed to generate code for at least three elements selected from a group consisting of dialog boxes, buttons, radio buttons, TextArea objects, user interface layout definitions, and forms. The system may also include one or more hosted services operated by organizations that differ from an operator of the hosted computer system, each hosted service accessible in response to calls by a macro to provide information to the macro during execution of the macro, or web page code for delivery to users of the hosted computer system that includes code for calling one of the plurality of macros and for using results generated by execution of the macros. Each of the macros may be assigned to a user account via a unique user identifier for an account of a user who published the macro to the datastore. The system may also include a wrapped service manager to provide a security wrapper around the macro code to control access to resources that correspond to the user, according to access permissions or restrictions identified by the user. The security wrapper may be arranged to generate a dialog box for the user, the dialog box arranged to receive input from the user when the macro is first run, regarding access levels to be provided to the macro.

In another aspect, a computer-implemented system for executing macros on a hosted computer system includes a plurality of hosted applications operable from the hosted computer system, and a macro data store storing a plurality of macros that are each assigned to a user account on the hosted computer system and that each define a series of actions to be executed by at least one of the plurality of hosted applications. The system also includes means for providing one or more selections of user interface elements to a macro author, and for generating macro code in response to a macro author selection of an interface element from the group and provision by the macro author of one or more parameters for the element.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
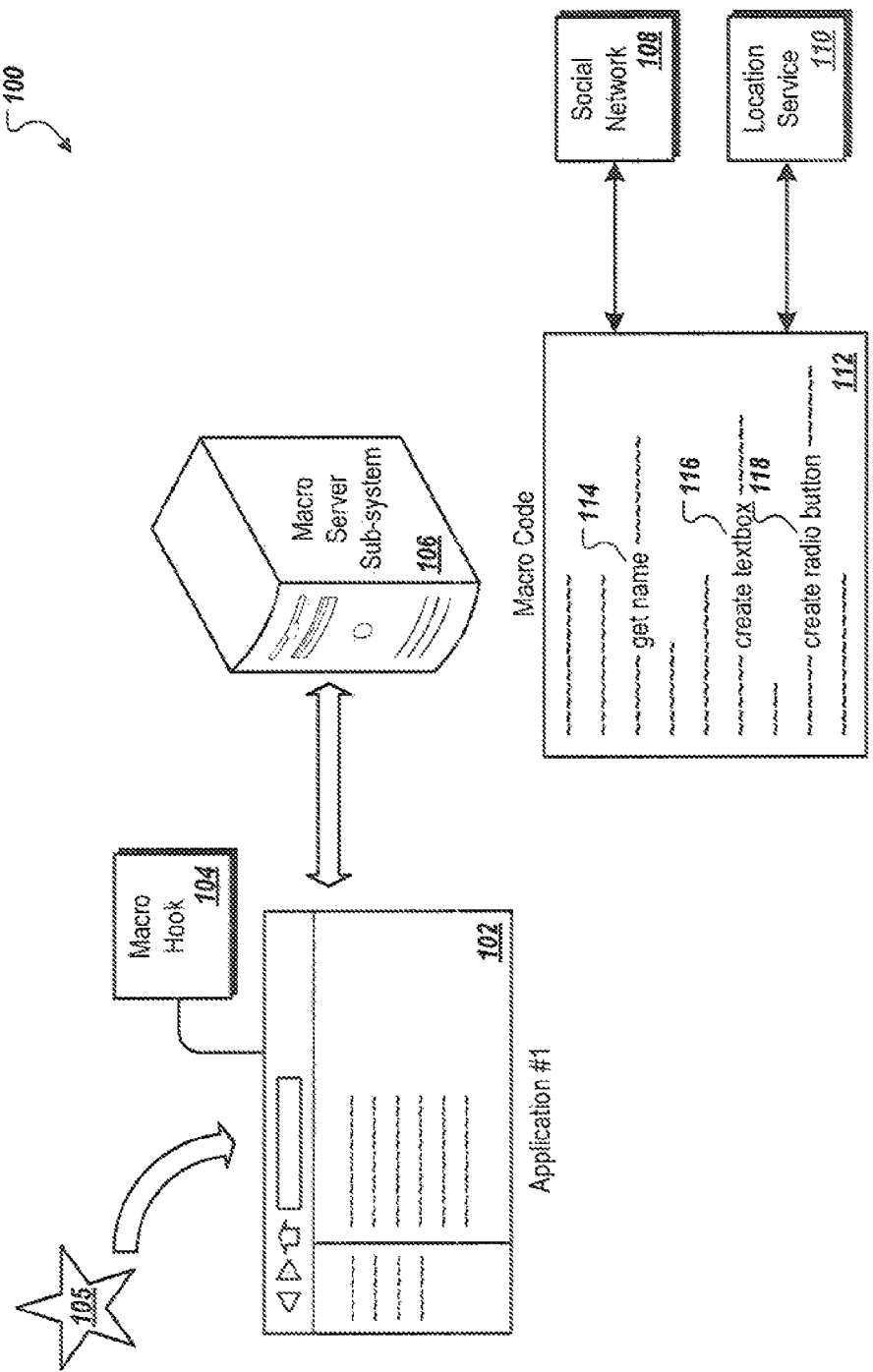
FIG. 1 is a conceptual diagram showing user interface script operation in a hosted computing system.

FIG. 1 is a conceptual diagram that shows macro operation in a hosted computing system 100. Such operation can be contrasted with macro operation on a client device or on a server that is directed to a single client device (e.g., via a remote desktop connection service or VPN) by enabling operation of the macro from various clients, when the user who created and/or copied the macro to its stored location is trying to access the macro while running an application from their desktop computer, their net book computer, or from a publicly available computer such as a computer in an internet café. Also, the macro can be shared easily between users, by a first user defining access restrictions on the macro that permit other users (e.g., users who access the system from the same domain as the initial user) to run the macro when using their own applications. Also, the macros can be executed for a user on a server system even when the user is not on-line, such as when an input external to the user and the user's computer triggers macro execution. Moreover, when the hosted system has multiple registered users who are related to each other (e.g., they all work for the same business organization), macros running in a hosted system can produce complex workflows that span across applications and/or data stores that correspond to multiple of such users.

The macros can be implemented using a scripting language. The scripting language can allow for the user interfaces to be defined using familiar, high level programmatic objects. For example, dialogs, submission buttons, radio selection buttons, check boxes, text input areas, forms, and other user interface features can be readily provided within a user interface based on a command language. The user interfaces can provide for flexible layouts. Layouts can include vertical pane layouts, grid layouts, flow layouts, or other layouts. A programmer can specify the positions of various user interface elements within the user interface (e.g., by identifying positions of elements by specifying coordinates of a grid).

The user interfaces can be rendered on a variety of output devices, including within web browsers displayed by personal computers, mobile computing devices, and other computing devices. Furthermore, the macros can allow for the definition of callbacks in response to known events (e.g., button click, value change, check box selection, etc.). The callbacks can result in an action being performed by the server or by the client device. For example, fields within a spreadsheet can be populated based on user input received by a user interface. In some implementations, a callback can result in the server sending commands to the client device that cause the user interface to be altered. For example, specified controls can be disabled based on a particular user input or other event.

As noted, macros may be triggered by external events, such as the receipt of an email message. Macros may run on a macro server sub-system that is separate from a user's client system and separate from any sub-system on which other services or applications are running. For example, services on other sub-systems may include anything that the macro accesses to get information, including internal services to the main system (e.g., location services and email services) and third-party services (e.g., from commercial on-line stores or auction sites, weather sites, and the like).

A macro server sub-system associated with the system may allow the user who writes macro code to write macros in a unified and consistent way, making the programming experience easy for the end user. For example, an object model may be defined for the different services that are exposed to the end user, such as manipulating spreadsheets and a calendar, fetching web content, sending emails, accessing their calendar, translating text, etc. The object model may be represented using, for example, Java objects. Each Java object may wrap an access method to the underlying service. Spreadsheets and language translation services may use internal direct network calls (e.g., remote procedure calls), and web content fetching may use, for example, SOAP or similar services. Many of these services need not be exposed directly to the end user.

The system 100 may eliminate the risk of exposing internal services to end users, by creating several layers of "wrappers" or "decorators" around the underlying Java objects. For example, the system 100 may include a quota enforcing layer, which limits the number of times a given service may be called by a given user. The system 100 may include a security layer, which may use capability-based security, allowing fine-grained access control (for instance, allowing read access but not write access to underlying data).

The system 100 may include various computer-implemented mechanisms for managing computer macros, where the code is stored for a macro at a location in an Internet-accessible hosted computer system and operable to perform the following functions. Upon receiving a request to execute the macro, such as from an application that is running on a client computer remote from the hosted computer system, the macro may be executed on the hosted computer system. For instance, the macro may run directly inside a macro manager or its communicatively-coupled components. The results of executing the macro may be provided to the application that is running on the client computer (e.g., a spreadsheet application that is running in a browser on the user's computer). The code for the macro in this situation may be stored and accessed apart from documents on which the macro is programmed to operate. For example, while the code may execute on the hosted services servers, the spreadsheet updated by the macro code may reside on the user's laptop computer or in another location at the hosted service, where the macro is free to be pointed to and accessed from any number of applications running on behalf of any number of users who are registered with the hosted service.

In some implementations, each macro may be associated with a registered user of the hosted computer system, and the macro may be made available to other users of the hosted computer system according to access restrictions identified by the registered user (or more specifically, to applications run on accounts of the other users). For example, the user who "owns" a macro (e.g., the author of a macro) may be associated with a user ID or a registered user account of the user who owns the macro. Furthermore, the user who owns the macro may identify other users who are authorized to use his macro, via their user IDs or via groups to which those users belong. In other cases, the user may provide a link or URL to the macro and include certain rights associated with running the macro. For example, certain security or access rights that are available to the registered user associated with the macro. The registered user can allow the macro to perform actions or access information that would not normally be available to users running the macro.

Access restrictions can be defined by one or more groups to which the registered user is assigned by the hosted computer system. For example, the user may grant macro access to a group named "MyOnlineFriends" and assign rights to all people in that group, which may represent his "friends" identified on his social networking site (e.g., Orkut etc.)

In some implementations, requests may be received to execute the macro where the requests originate from multiple applications running on multiple different client computers remote from the hosted computer. For example, the applications may generate or fire "events" which, in the definition of the macros, are designed to start the macro's execution, or to resume or continue the macro's execution after being in a wait state. The system 100 may automatically execute the macro on the hosted computer system for each of the requests from the location. The system 100 may further provide results of executing the macro to each respective application of the multiple applications in response to executing the macro. In some implementations, the multiple applications correspond to a single accountholder. For instance, each application that requests execution of the macro may receive the results. In some implementations, the multiple applications correspond to multiple different accountholders (e.g., multiple registered users of the system 100).

Executing a macro can include making calls to multiple different hosted services provided by the hosted computer system. For example, a macro may call a calendar service, a contacts service, a location providing service (e.g., a service that indicates a location of a user or friends of the user), and so on. Executing the macro can, alternatively or in addition, include making calls to web services provided by third-party information providers that are independent of the hosted computer system (e.g., that are at a domain that differs, and that are operated by an organization that differs, from that of the hosted computer system).

Information generated by a first application that is executing on the hosted computer system may also be translated from a first format to a second format, and the translated information may be provided to a second application that is running on the hosted computer system. For example, data may be created in comma-delimited format by a word processing application, and the data may then be provided to a spreadsheet application for pasting into spreadsheet cells in format specific to the spreadsheet application.

The results of executing a macro can also be provided automatically to multiple different accounts for multiple different users who are registered with the hosted computer system. For instance, a macro can provide a user interface to a user in order to prompt the user to enter information. The information received from the user using the user interface may be provided to several users on several computer systems, such as to update a common spreadsheet cell on each of their systems. In some implementations, a request to run a macro is received in response to a browser on the client computer loading a web page having a pointer to a JavaScript macro on a macro execution sub-system in a hosted computer system. For instance, when macros are shared by passing links or URLs to the macros, a request to execute the macros (e.g., in JavaScript or any other relevant language) may be provided in the form of a link or URL.

Referring now more particularly to FIG. 1, and as an example for implementing some or all of the functionality just discussed, the system 100 includes one or more applications 102 (each having access to a macro hook 104, which causes the execution of a macro when it is accessed), one or more external events 105, a macro server sub-system 106, a social network 108, a location service 110 and macro code 112.

The applications 102 may include any applicable applications that a user may cause to run or execute, such as email applications, spreadsheet applications, word processing applications, photo sharing applications, presentation packages, financial planning applications, etc. In some cases, the user may start an application explicitly by selecting the application to run, such as by double-clicking on the application name on a desktop or in a pull-down list of applications. Other applications may be started implicitly, such as when a user clicks on an email attachment (e.g., a text file or a spreadsheet), or when a user clicks on an unknown file, either of which may automatically start execution of the corresponding application associated with the file, such as based on the extension name of the file or other defined association. A user may also start an application by navigating to a URL that is directed to the application, such as a hosted application.

In yet another example of starting or executing applications, an event 105 may occur, such as the receipt of an email message, which may start or resume the execution of certain applications. For example, the event 105 (e.g., a received email message) may trigger a macro (e.g., to update a spreadsheet, adding the subject line). The occurrence of the event may be detected by an event handler that runs on a hosted system and that tracks events for each of the users that are registered with the system. Each event may be reported, may then be correlated with a particular action such as the execution of a macro, and the action may be triggered.

Each of the applications 102 has access to a macro hook 104. In the simplest of implementations, the macro hook may simply be a URL that points to code for the macro stored on, and executable on, the system 100. For example, the hook 104 may be a URL that points to JavaScript code, and may be included in a web page, so that when the web page loads or a certain event associated with operating the web page occurs, the code may be accessed and run. In addition to facilitating the definition of macros within that application 102, or alternatively, the macro hook 104 may perform event tracking and provide a connection between external events 105 and the macro server sub-system 106. For example, the macro hook 104 may allow the user to define macros associated with events related to emails received in an email application 102. As another example, the macro hook 104 may allow the user to define macros associated with events related to selection of specified cells within a spread sheet application. The macro may identify objects that are different from what the email application 102 may provide. Moreover, the macro code 112 of the macro may be in a different language than the native language of macros in the email application 102. The macro hook 104 may also track any events related to that macro, and may interact with the macro server sub-system 106 at the proper time. The macro hook 104 may be instantiated or realized by the user by selecting an option to record a macro or execute an existing macro.

External events 105 may include a variety of events for triggering the execution of a macro, including the receipt of an email message (e.g., in an email application), the determination (e.g., by the application) that certain conditions exist (e.g., quotas exceeded, user access is denied, a process has completed, etc.), the selection of one or more specified cells within a spread sheet application, and so on. Such events may be tracked by an event handler, and particular events to be tracked may be registered with the event handler for each user who desires that a macro or macros be executed upon the occurrence of a particular event in the system 100. In some implementations, a macro can be executed in response to an explicit selection by a user. For example, a user of a spread sheet application can select an icon to cause a macro to be executed. The executed macro can then, for example, provide a user interface to the user.

In some implementations, events may be trapped within code, such as when a line of code determines that certain conditions are met (e.g., a variable has reached a certain value, or accounting updates are done for the night, etc.). External events 105 may also include a detection of a message such as a text message, a blog entry, an incoming RSS feed or the like. External events 105 may include the detection of a posting of a particular item on an online auction site, as may be determined, for example, by the title or description of the auction item (e.g., "vintage Vatican license plate").

A triggering condition for an external event 105 may include different combinations of conditions. For example, conditions that are used in triggering events related to email applications may include email subject lines, sender Ds (e.g., boss, spouse, children, etc.), recipients (e.g., using combinations of "To" vs. "Cc" vs. "Bcc"), the number of recipients (e.g., tell me when I am the only recipient, etc.), whether there is an attachment, the location from which the email was sent, keywords in the message body, or whether the email is likely to be spam. Conditions that may correspond to word processing applications may include the size of the document, the document's source, the document's creation date and/or most recent date of modification, the author of the document, and so on. For spreadsheet applications, conditions that may be use used for triggering events include the value of a particular spreadsheet cell, whether a cell's value has changed, the number of rows or columns of actual data in the spreadsheet, the spreadsheet's author, the spreadsheet's size, the location of a selected cell, the value of a selected spreadsheet cell, etc. Conditions that apply to other types of documents may include whether a change has just occurred to that document. Other triggering events may be generated by sources or services on the web, such as, for example, an alert posted by an online weather services site warning of a tornado heading toward a particular town. In such a case, a weather-cautious user may have already constructed a macro to intercept the external weather-related event and generate texts and/or phone calls to his family or neighbors.

The events may also be a combination from a number of different sources. For example, an initial event may be triggered initially by the receipt of an email from a particular user, but a macro may only be executed after that event occurs and it is determined that the user sending or receiving the email is in a particular location, using a location tracking service. Additional or alternative conditions using information from other services may also be imposed.

The macro server sub-system 106 may monitor for particular events in the system 100, such as events that are propagated by the applications 102 (e.g., email messages, etc.). The particular events of interest to the macro server sub-system 106 may include any relevant events that may be addressed by a macro, in addition to events that may serve as instructions to the macro server sub-system 106 (e.g., "suspend communication with server XYZ, application ABC or user John Doe until further notice").

Various services can interact with the system 100, either by being triggers for events, input for macros running in response to triggers, or outputs from the macros. For example, a social network 108 may provide information to the system 100 that is useful for determining how to handle events. As one example, a macro may be defined to perform an operation upon receipt of an email sent to Betty, but only if the email is from one of Betty's friends (e.g., as defined on one or more social networks). In another example, a macro may be designed to send automatic emails or other notifications to all of Betty's "friends" (e.g., as defined by social networking sites or groups). The organization that runs the social network 108 may be different from the organization that runs the sub-system 106, the operator of the former system 108 may provide access to certain information via an API, and to the extent that the operator of the sub-system 106 has been given such access.

As another example, a location tracking service 110 may, when invited by users, track the location of mobile devices associated with the users, such as so that users may find their friends and vice-versa. In this and other examples described herein, users may be provided with an opportunity to opt in/out of programs or features that may collect personal information (e.g., information about a user's preferences or a user's contributions to social content providers). Users may also be informed of the accompanying limitations on the functionality of a service that may result from limiting access to such personal information. In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

Returning to the present example, macros may be defined to send the user an email or text, and the destination of the email or text may depend on the user's location at the time. For instance, if the user has a cell phone or other mobile (e.g. GPS-based) device, the user's location may be tracked or known by the location tracking service 110. Depending on the user's location, an email that is propagated by executing the macro may be sent to the user's mobile device or to a device at home (e.g., if the user is nearer to his house or if the location service 110 determines that the user is probably headed in that direction).

In addition to "where am I?" location information sent, for example, from the user's GPS-enabled device, the user may also receive "where should I go?" information through the location tracking service 110. This information may include, for example, GPS coordinates or simple text messages (e.g., "turn here, and then go up the hill to 10107").

The sub-system 106 can store, track, access, share, and execute various instances of macro code (i.e., script code). The macro code 112 that makes up macros may be in any appropriate language, but may typically be written or programmed in the preferred macro language (e.g., JavaScript, etc) used by the system 100. As a macro is executed in a familiar manner, the macro server sub-system 106 may parse (or search for) function- and macro-related segments of the macro code 112, such as a "get name" function 114, a "create textbox" function 116, a "create radio button" function 118, or any other functions or macros that the macro server sub-system 106 is to consider. Each of the functions or operations embedded in the macro code 112 may cause the macro server sub-system 106 to perform different types of processing, such as to check user authorization to access a file, to provide a user interface, etc.

The macro code 112 may be stored in a variety of locations, such as a central macro repository or in an Internet-accessible hosted computer system. In some implementations, the entire collection of macro code 112 may be stored in a distributed manner and logically tied together by one or more networks.

In some implementations, when macro code 112 is sensitive (e.g., it contains or updates users' personal information) or classified (e.g., Secret, Top Secret, etc.) for reasons of national defense, the macro code 112 can be explicitly stored in a separate location, such as on secure servers. Users may be provided with an opportunity to opt in/out of programs or features that may collect personal information, for example, and certain data may be anonymized in one or more ways before it is stored or used, so that personally identifiable information is removed.

In some implementations, "listeners" can be used for event tracking. Users may be provided with an opportunity to opt in/out of programs or features that may collect personal information, for example, and certain data may be anonymized in one or more ways before it is stored or used, so that personally identifiable information is removed. When a spreadsheet is loaded on the server and its HTML is sent down to the browser, it may trigger a server-side event that indicates that a new spreadsheet has been opened, for example. A listener on the spreadsheet server for this event may then check to see if it has the list of scripts for that spreadsheet. If not, it may make a call (e.g., to a script server), saying, in essence, "are there any scripts for this spreadsheet?," and passing the spreadsheet key, then storing that list of scripts. The event handler on the spreadsheet server may then check if any of the script methods are called "onOpen". If so, it may send a message (e.g., to the Apps Script server) to execute that method. This flow may also be used in other scenarios, such as edit events, etc.

As another example, a macro can perform certain actions based on information provided by a user through a user interface displayed by the macro. The user interface can prompt the user to provide information, for example, in the form of text, or selections (e.g., check box or radio button selections). The macro can be associated with a spread sheet application and cause certain cells to be populated with information based on text or selections provided by the user. As another example, the macro can be associated with an email application. The macro can cause the email application to send an email to a first recipient if a first user selection is made while causing the email application to send an email to a second recipient if a second selection is made. For example, if a user selects a check box to indicate that information being entered is accounting related information, an email can be sent to an accounting representative, while if a user selects a check box to indicate that information being entered is marketing related information, an email can be sent to a marketing coordinator.

In yet another example, a macro may be associated with an email application that has been set up to perform certain message routing that depends, for example, on the subject line, the email's sender, whether there is a very large spreadsheet attachment to the email message, whether there is an attachment (of any kind), and so on. A macro that is defined in such a manner may also use location information, such as provided by the location tracking service 110. If, for example, an email message that is destined for the user's work email has a large spreadsheet attachment and the user is determined to be at home (because GPS signals from their mobile device correspond to a location that has been registered as the user's home), the macro may be established to forward a copy to the user's home email. In such a situation, the attachment may likely be a work-related spreadsheet that needs review for a presentation or project at work the next day. Alternatively, for those instances in which the user may be discovered to be located nowhere near his house, the macro may be established to send a small message to the user's mobile email-enabled device, alerting the user that the email exists.

In either case, the macro code 112 may be stored on the macro server sub-system 106, removed from any application 102 that causes the macro to execute. For every incoming email message received, the email application 102 may trigger the macro by pointing to the macro code with the hook 104. The macro may then identify various aspects of the message, such as whether a particular sender is a member of the accountholder's social network. If the social network check results are positive, the macro may further check a location tracking service 110 to determine a geographic location of the sender or of the accountholder, and may cause certain actions to be performed based on such locations. Users may be provided with an opportunity to opt in/out of programs or features that may collect personal information, for example, and certain data may be anonymized in one or more ways before it is stored or used, so that personally identifiable information is removed. The macro server sub-system 106 could notify the accountholder, in certain situations, based on the location of the accountholder (or user), for example. In other cases, the macro server sub-system 106 could cause the accountholder to be called (e.g., via a universal call routing system that uses VOIP), and/or cause an SMS message to be sent, or other actions defined by the macro.

The macro may obtain and provide such information by accessing the various applications that run on the system 100, via one or more acknowledged API's. Where there are multiple different API's a translation service may be provided with the sub-system 106 so that authors may write for a single macro language for the sub-system 106, while still working with disparate applications.

Several benefits may result when macros are hosted on a macro server sub-system that is separate from users' client computing devices. For example, macros can be used across many different applications. Also, the macros can be triggered while the user is on-line from various access points such as their desktop computer, someone else's computer, a net book or a smart phone, and the macro can be triggered even when the user is not on-line or at their computer. Such a macro may be defined to intercept an event in one type of application (e.g., email) and update data in another application (e.g., spreadsheet, where subject lines of incoming email messages for a user are compiled in a spreadsheet automatically).

Another benefit can be the ability for a programmer to define user interfaces using familiar, high level, strongly typed programmatic objects. The user interfaces can have flexible layouts that can be rendered on a variety of output devices, including a variety of browsers. The macros can allow for callback functions to be defined for known events, such as user selections, value changes, or particular values entered. The callback functions can trigger server side or client side actions as well as allow for server script actions to return commands to the client device in order to alter the appearance of the user interface.

Another benefit can be the ability to completely share macros between users without having to manually copy them. Instead, one or more security levels may be set on each macro, allowing access to other users as determined by the user who created or first saved the macro. For example, the user may set an access security level for the macro and provide the URL of the macro to another person, just as may be done, for example, for common web properties such as on-line photo sharing sites.

Macros hosted on a macro server sub-system can also, in certain instances, have the benefit of providing the ability to run a macro against data from a variety of users, or to provide the results of running a macro with a variety of users. For example, a shared macro may be used to combine contributions by several authors into a larger volume, such as poetry or articles written by several people. Each contributor's document may be saved in a predetermined location, and the macro may access it if the contributor has provided access to that location. The combined volume may then be made available as a single document to each of the contributors and perhaps additional users. As another example, a business workflow application could be created using macros on a hosted sub-system, such as to route a document for approval, where the document is at all times stored locally on the server system.

Figure 2:
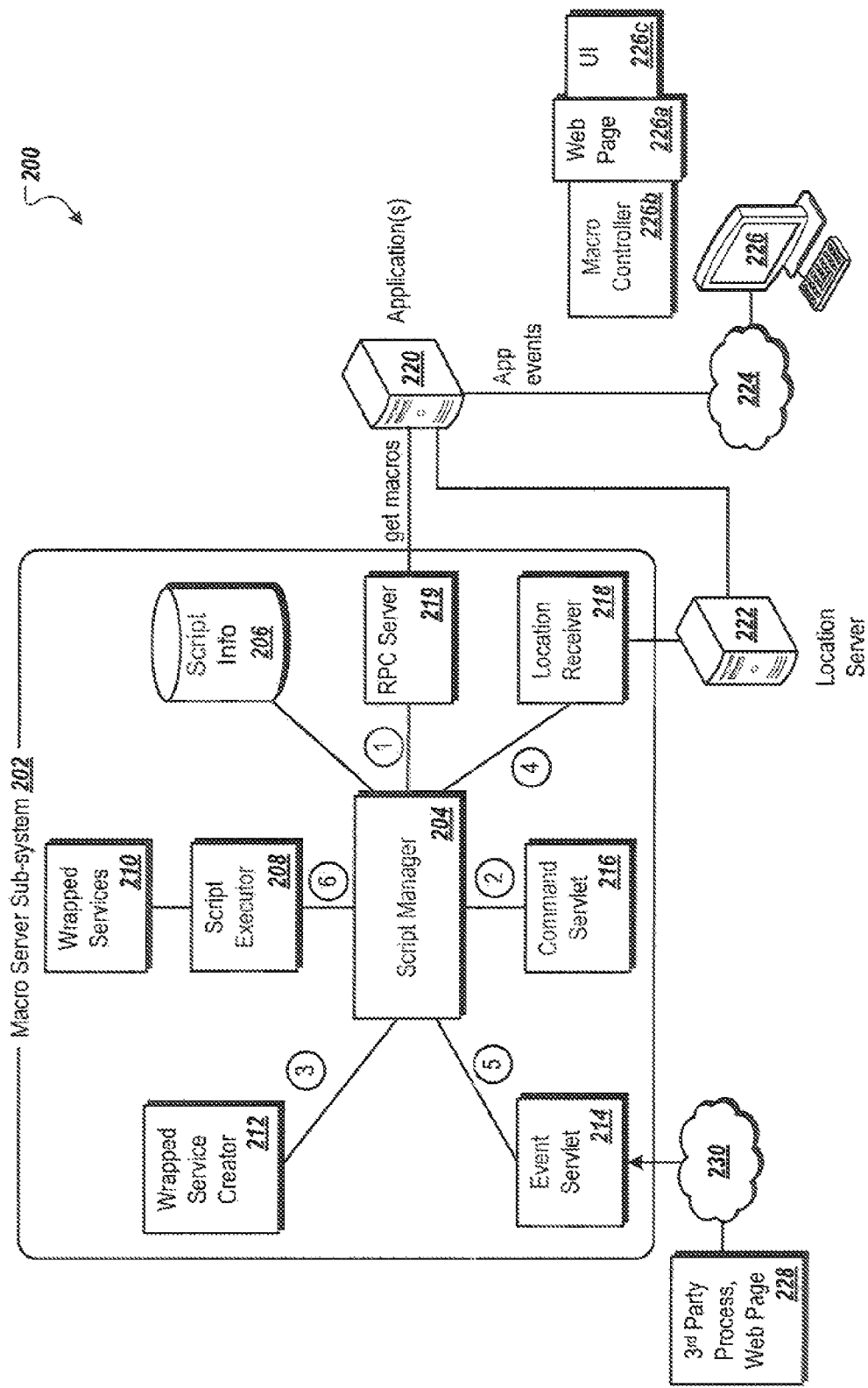
FIG. 2 is a schematic diagram of a hosted computer system capable of operating shared user interface scripts.

FIG. 2 is a schematic diagram of a hosted computer system 200 capable of operating shared macros. In general, the system 200 provides various components that show one example of a manner in which macros can be created by users, saved, shared, accessed, and executed on a hosted system.

In this system 200, a macro server sub-system 202 provides a location for saving macro code in a persistent manner in a script information storage data store 206, where the saved information may include a macro library name, script contents, and an identifier of a macro owner (e.g., using an obfuscated user ID or other identifier). When a macro is run, a command may be sent to the macro server sub-system 202 to execute the given macro. The code may then be retrieved from the script information storage data store 206, and an instance may be created in a script engine, or script executor 208. In some implementations, the macro can be executed with some or all of the permissions of macro owner (e.g., as if the macro were executed by the macro owner) in situations in which the macro is executed by a user other than the macro owner.

Java objects representing the programmatic API for different server-side applications can be constructed, and can be wrapped in a capability-based security wrapper, and become programmer-visible wrapped services (or "beans"). The wrapped services 210 may include all of the relevant services that the macro server sub-system 202 may serve, for example, to consumers of wrapped services related to macro execution. A wrapped service 210 may be any relevant object that is a collection of other objects, packaged so that they may be passed around easily.

The wrapped services may include a Java business delegate that exposes public methods that interact with backend services. The public methods may be included in packages or other mechanisms for packaging methods, classes, strings, spreadsheets, application programming interfaces (APIs), and other tools provided by various computer languages (e.g., Java, etc.). The public methods may expose (or make public) resources, for example, that may be used to define and execute macros. Certain details of implementation of the public methods may be held private, which may provide suitable levels of information hiding and abstraction. The public methods may look similar across several different types of objects, exposing a somewhat consistent look and feel to macro users, and thus providing a level of polymorphism. As a result, the collection of wrapped services may facilitate the use of macros by users in an object-oriented, event-driven environment.

These wrapped services, or beans, are attached in this example system 200 to a top-level Java object that has public members for each property (e.g., spreadsheets, calendars, etc.) This top-level Java object is inserted into the scope for the environment of the script executor with a standard and predetermined label. In some implementations, the script executor reflects public members (and only public members) to the scripting environment.

Therefore, when a user's JavaScript code executes $$\text{var doc=google.spreadsheets.create("my new doc");} \quad (1)$$

the "create" Java method on the Java object in the "spreadsheets" field of the top-level object is called. The Java implementation of this method makes a remote procedure call to the spreadsheet server, with a "CREATE" command and an argument corresponding to the new title (e.g., "my new doc"), along with an obfuscated identifier of the script runner. The spreadsheet server creates the new spreadsheet and returns its key in the response to the remote procedure call. The macro server creates a new Java object representing the newly created spreadsheet, containing the new key. The Java object includes methods for several spreadsheet operations, such as "rename", "insertSheet" and so on. That object is also wrapped in a capability-based security wrapper and returned. The script executor internally wraps this object into a Native-JavaObject wrapper, and returns it to the variable "doc" above.

In some implementations of wrapping objects, any appropriate service (e.g., spreadsheets, calendar, email, etc.) may return objects that are wrapped in Java dynamic proxies. Distinct proxies may exist, such as for security, logging, and quota. Each proxy may incorporate or use a description of what service it is exposing (e.g., a Java interface, such as "Spreadsheet", "SpreadsheetRange", "EmailService", etc.) which may define the public methods. Annotations may exist on the interfaces, appropriate for the different wrappers.

For example, a "create" method on the SpreadsheetApp service may create a new spreadsheet. It may have one annotation that declares that the method is a WRITE method, providing a mechanism, for example, to warn the user that the script will attempt to write to their collection of spreadsheet documents (and the script will fail at runtime if the user has not authorized a WRITE privilege for the script). Basically, the security wrapper helps to ensure that a given method's declared required permissions (WRITE, etc.) are in the user's authorization token. If the method is authorized, it passes the call to the next layer.

Security may also be provided by limiting the number of times a particular user can access an operation with respect to a macro. To perform such functionality, a quota annotation can exist on the "create" method, saying that calls to this method should be counted against the end user's "create spreadsheet" quota. The quota wrapper may call or use a quota service that keeps track of how many times a given user causes an operation to be performed. The method may fail, for example, if the user is over quota; if not, it again passes it down to the next layer. The quota for a user may be measured across a set time period, such as a day, a week, or a month, and may reset or decrement at periodic points in time.

A transcript of the macro executions may also be provided by a logging layer that records a string version of each method called, and the arguments provided.

The wrapped service creator 212 may create top-level wrapped services, the extent of which depend on the macro and its environment. For example, the wrapped service creator 212 may examine the capabilities that the end user who is running the macro has explicitly granted the macro, and may create top level beans corresponding to the state of the macro. The state may include, for example, the current document (e.g., email, text document, drawings, spreadsheet, etc.), if any, and user authentication. The wrapped service creator 212 may generate top-level wrapped services, having a capability that is based on the environment, and may inject the wrapped services 210 into the script executor's 208 execution environment where the user can, for example, define and execute macros. In a sense, the wrapped service creator 212 may be thought of as a producer or factory for beans, or a "bean factory."

The types of wrapped services 210 that may be created include, for example, capability-wrapped instances of spreadsheet applications, calendar applications and so on. This Java object may be inserted into the execution scope. The source of the object may be used to identify it (e.g., with the label "TopLevel"). Hence, "TopLevel.spreadsheets", for example, may become a reference to the capability-wrapped object (e.g., the SpreadsheetApplicationApi object). The object's public methods may be reflected as Java objects into the JavaScript programming environment and may be made available for macros.

For example, JavaScript code such as:

```
var doc=spreadsheets.getActiveSpreadsheet( );

var otherDoc=spreadsheets.openByName("MyO-
    therDoc ");

var value=doc.find("A1").getValue( )

otherDoc.find("B2").setValue(value);                    (2)
``` may open an existing spreadsheet (e.g., a spreadsheet called "MyOtherDoc") and copy the value of cell A1 from the current spreadsheet to cell B2 of the new spreadsheet. Java objects such as a Range object returned by a "find" method are capability wrapped, as are all others, and may fail if the authenticated user does not have access to the relevant spreadsheet. For example, in the copy/paste cell example previously presented, accesses required for successful execution are read access (e.g., required by getValue) on the active spreadsheet, and write access (e.g., required by setValue) on the target spreadsheet (e.g., the spreadsheet "MyOtherDoc").

The script executor 208 may be responsible for creating a context for the macro and performing the actual insertion of the top-level wrapped service 210. A new top level scope may be created for each macro execution, such as to prevent the possibility of one executing script "poisoning" the global scope for other scripts. The macro context may be loaded with an implementation of a class shutter or filter, which prevents the creation of any Java classes that are not approved (e.g., not on the white-list of allowable classes). Additionally, the script executor 208 may create an instruction counter for throttling runaway scripts, such as to detect when a script has entered an infinite loop. In some implementations, runaway scripts may be terminated prematurely by the script manager 204.

The script executor 208 may be responsible for various functions, including parsing, checking syntax, function calls, macro execution and resumption. The parse function may examine a script and return a list of functions and macros discovered in the script storage in a data store, such as the script information data store 206. For example, referring to FIG. 1, the functions and macros detected as a result of the parse function may include the get name function 114, the create textbox function 116, the create radio button function 118, or any other functions, macros, etc. that may be embedded in the script or macro code (e.g., macro code 112).

Other functions supported by the system may also be used to help manage a collection of macros on a server-side system 200. For example, a syntax checking function can, before storing a script, determine if there are errors in the script (e.g., syntactical errors, language-compilation errors, misuse of keywords, etc.) in it. If syntactical or other errors are detected, the errors may be communicated, alerting the user or script programmer.

A call function may "call" (or start the execution of) a function in a macro. This call function may be a limited version of executing the macro, such as a version that has privileges granted for in-cell (e.g., in a spreadsheet) function calls. For example, limited versions of macros may be limited to only returning a value, while not be allowed to create side effects.

Macro execution and resumption functions may be used to start and resume macros. For example, the macro execution function may start the initial execution of the macro. In some cases, execution of the macro may require additional input from the user. In this case, execution of the macro may suspend, or enter a wait state, pending input from the user. Once the user input has been provided, the resume macro function may continue the execution of a macro that had been halted.

The script information repository 206 may serve as a data store, providing and/or supporting operations such as script/macro creation, storage, retrieval, update, deletion, etc. Scripts stored in the script information repository 206 may be organized by user library, individual script, or application (e.g., applications for email, spreadsheets, word processing documents, etc.). Operations may be performed on an entire user's library, or on individual elements in the library. For example, one operation may retrieve a user library by its ID (e.g., a primary key lookup based on the name of the library). Another operation may retrieve all user libraries linked to a given document, such as a document representing a macro or script.

Retrieval operations provided by the script information repository 206 may include operations that retrieve the authorization for a given user on a given user library, retrieve all user libraries owned by a given user, retrieve a continuation record by its ID, etc.

Creation/update operations provided by the script information repository 206 may include an operation to create/update a user library, an operation to create an association from a library to an abstract object's key (e.g., a document ID), an operation to create/update the authorizations for a given user on a given library, an operation to create a new continuation record (e.g., with serialized binary data, for a given user) and library and other creation/update operations.

Operations provided by the script information repository 206 that perform deletions may include an operation that deletes a continuation record, an operation that deletes an association from a library to an abstract object, and an operation that deletes a library, removing all child objects, including child objects associated with authorization and link continuation. An example logical structure of the script information repository 206 is described below with respect to FIG. 5.

The script manager 204 may delegate commands to the underlying components 206 through 219 of the macro server sub-system 202. Descriptions of specific example commands follow, and the delegation control paths to the underlying components 206 through 219 are marked with a series of lettered process arrows 1 through 6, which are generally lettered chronologically, though certain actions may occur in another order where possible.

One command that the script manager 204 may perform (e.g., by delegation) is to store a user library. The command may be limited in its execution, for example, based on the user privileges or other security. For example, if the user library representation (e.g., a protobuffer or protocol buffer) contains a library ID, the script manager 204 may ensure that the executing user is allowed to modify the library. If authorization occurs, then the script manager 204 may write it to the storage layer and return the new representation of the library.

If no ID is present, a new ID may be created, and the representation containing the newly generated ID may be returned. Storing a library may involve, for example, parsing the functions in the library (e.g., using the script executor 208), adding the functions to the library DAO object, detecting syntax errors (e.g., using the script executor 208), storing the library content, and storing the owner. Referring to FIG. 2, the components involved in storing a user library may be indicated, for example, by process arrows 1, 2 and 6.

Protocol buffers, for example, when used for the user library representation, may include a data structure which can be serialized over the wire or persisted in binary form in a database. The data structure can use strongly typed fields in order to enforce communication protocols.

Another command that the script manager 204 may perform is importing a library. This command may create a link or other association of a library to a given document (e.g., a spreadsheet, an email calendar, or any other attachable context). For example, an email message may be associated with the user's given mail account. The purpose of the link is so that the underlying document may quickly discern which macros are associated with it, to display in "Run" menus, for example. For example, a library importing command may create a "Link" table entry in the data store. Referring to FIG. 2, the components involved in importing a library may be indicated, for example, by process arrows 1 and 2.

The copy command, which is another command that the script manager 204 may perform, copies an existing library, making a duplicate of its contents. For example, all of the scripts and macros contained in the library can be copied to a new library name. While the act of copying makes a duplicate of the library's contents, the associations are not copied. The newly created library's owner is set to the current owner. Upon completion of the copy operation, the ID of the new library is returned. For example, the copy command may create a new "UserLibrary" table entry in the data store, without copying over any links, continuations or authorizations. Referring to FIG. 2, the components involved in copying a library may be indicated, for example, by process arrows 1 and 2.

A delete library command can, for example, check for permission, then if allowed, it may delete the library from the data store (e.g., in the script information 206). For example, the delete library command may remove the entry from the "UserLibrary" table and all child tables. The front end may be responsible, for instance, to do any "are you sure?" interrogations. The components involved in deleting a library may be indicated, for example, by process arrows 1 and 2.

A command to get libraries by a user may return the libraries owned by a given user, based on the ID of the user. For example, the command may return the user library (e.g., in a UserLibrary or other table) entries stored in the script information 206 where the owner field is the current user. Referring to FIG. 2, the components involved in obtaining libraries for a user may be indicated, for example, by process arrows 1, 2 and 4.

A command to get libraries by document may return any libraries imported by a given document. For example, the get libraries command may scan the Link table for "documented" fields that match, and return the parent "UserLibrary." Referring to FIG. 2, the components involved in obtaining libraries for a document may be indicated, for example, by process arrows 1, 2 and 4.

A categorize library command may add an association to a "virtual" document, such as "SAMPLES.". For example, the categorize library command may create an entry in the Link table with the given name (SAMPLES, etc.). Referring to FIG. 2, the components involved in categorizing a library may be indicated, for example, by process arrows 1 and 2.

A get libraries for category command may return all libraries with a given categorization. For example, the get libraries for category command may be similar to getting libraries for a document. Referring to FIG. 2, the components involved in searching libraries by category may be indicated, for example, by process arrows 1 and 2.

An evaluate function command may retrieve the function from the library and pass it to the script executor 208 for execution. Referring to FIG. 2, the components involved in evaluating a function may be indicated, for example, by process arrows 1, 2, 3, 5 and 6.

An evaluate macro command, when provided input parameters (e.g., library ID, macro name, and contextual information about the current document, if any), may create the programmatic beans with wrappers and pass wrapped services to the script executor 208 for execution. Referring to FIG. 2, the components involved in evaluating a macro may be indicated, for example, by process arrows 1, 2, 3, 5 and 6.

A continue macro command, when given a macro library ID and continuation ID, may invoke a continuation operation on the script executor 208. For example, such a command may cause a paused executing macro to continue actively executing. Referring to FIG. 2, the components involved in continuing a macro may be indicated, for example, by process arrows 1, 2, 3 and 6.

An update authorizations command can, for a set of authorizations for a given user and a given macro library, update (or add) an entry in the data store. Referring to FIG. 2, the components involved in updating authorizations may be indicated, for example, by process arrows 1 and 2. In some implementations, "get library" and other commands may typically act only on the script storage layer, and not invoke the script executor 208.

Referring now to another component of the system 200, the command servlet 216 may cause macro commands to be executed by responding to requests from a macro controller (e.g., the JavaScript macro controller "MacroController.js"). The response may occur as a redirection, such as a redirection that is transparent and automatic to a user. In one example redirection technique, at the time a browser client make requests to a specific URL, a redirection rule may direct the request to the macro server, such as the macro server subsystem 202. The types of requests that the command servlet 216 may handle include, for example, several requests with names such as, GET_ADMIN_PANEL, SET_SCRIPT, etc.

For example, a GET_ADMIN_PANEL request may return the full HTML of the macro admin panel, and the macro controller (e.g., MacroController.js) may insert the HTML into a closure dialog. A SET_SCRIPT request may send the script content and user library ID to the command servlet 216. The command servlet 216 may invoke the script manager 204 to create/update the user library, which may result in returning the HTML (e.g., generated by a GXP) for the left hand side of the panel (containing the categories and library names). The macrocontroller.js may render that HTML in the div for the left hand side panel.

A GET_SCRIPT request may fetch the script content for the given library from the Script Manager, and may return a content pane (generated via GXP) for editing that script. The macrocontroller.js may put that HTML into the content div of the panel.

An IMPORT_LIB request may invoke the ScriptManager with an import library command. The request may render the left hand side of the panel via gxp and return it to the macrocontroller.js.

A COPY_LIB request may be similar to the IMPORT_LIB command, but uses a copy command rather than an import command. A DELETE_LIB request may be similar to the IMPORT_LIB, but may use the delete command, for example, so as to return the entire admin panel HTML via gxp. A CATEGORIZE_LIB request may be used as an "add to samples" feature. Like import_lib, CATEGORIZE_LIB may invoke the Script Manager with the categorize lib command and returns the left hand side of the panel for redrawing.

A RUN_MACRO request may take a macro name, library id, and serialized representation of the state of the document (e.g., current selection, etc), and invoke the script executor 208 to execute the given macro. If an error occurs, an error message is thrown back to macrocontroller.js for display to the user. If the user has to authorize the macro, a message may be sent back to the macrocontroller.js to prompt the user.

The macro server sub-system 202 interacts with applications 220 and a location server 222 through a network 224. The applications 220 may be applications being executed by a user employing a user device 226, such as a web browser running on the user's laptop computer. The user device 226 may display, for example, a web page 226a (e.g., using a spreadsheet server). The user's web browser may employ a macro controller 226b in order to control the execution of macros on the user's user device 226. In some implementations, the user device can display a user interface 226c in response to commends executed by a macro. The user interface 226c can be displayed as part of the web page 226a or separate from the web page 226a. In some implementations, various different user devices can incorporate different macro controllers so that a user interface for a particular macro can be rendered on a variety of different user devices. In some implementations, a designated user interface renderer can exist for each of a variety of different user devices (e.g., cell phones, smart phones, desktop computers, etc.).

External events from third-party processes and web pages 228 may serve as the triggering mechanisms for macros that are defined within the macro server sub-system 202. The external events may be received via a network 230, such as the Internet. The external events here may correspond to the external events 105 described with respect to FIG. 1.

Thus, by these structures, a computer user may log onto a hosted computer service and access a number of different applications and services. The user may explicitly choose to execute a macro, or the macro may be automatically triggered, and the macro may run in the application and other relevant applications that may be automatically instantiated if they are referenced by the macro. As a result, the user may have access to a wide variety of data and programming mechanisms to produce robust on-line services.

Figure 3:
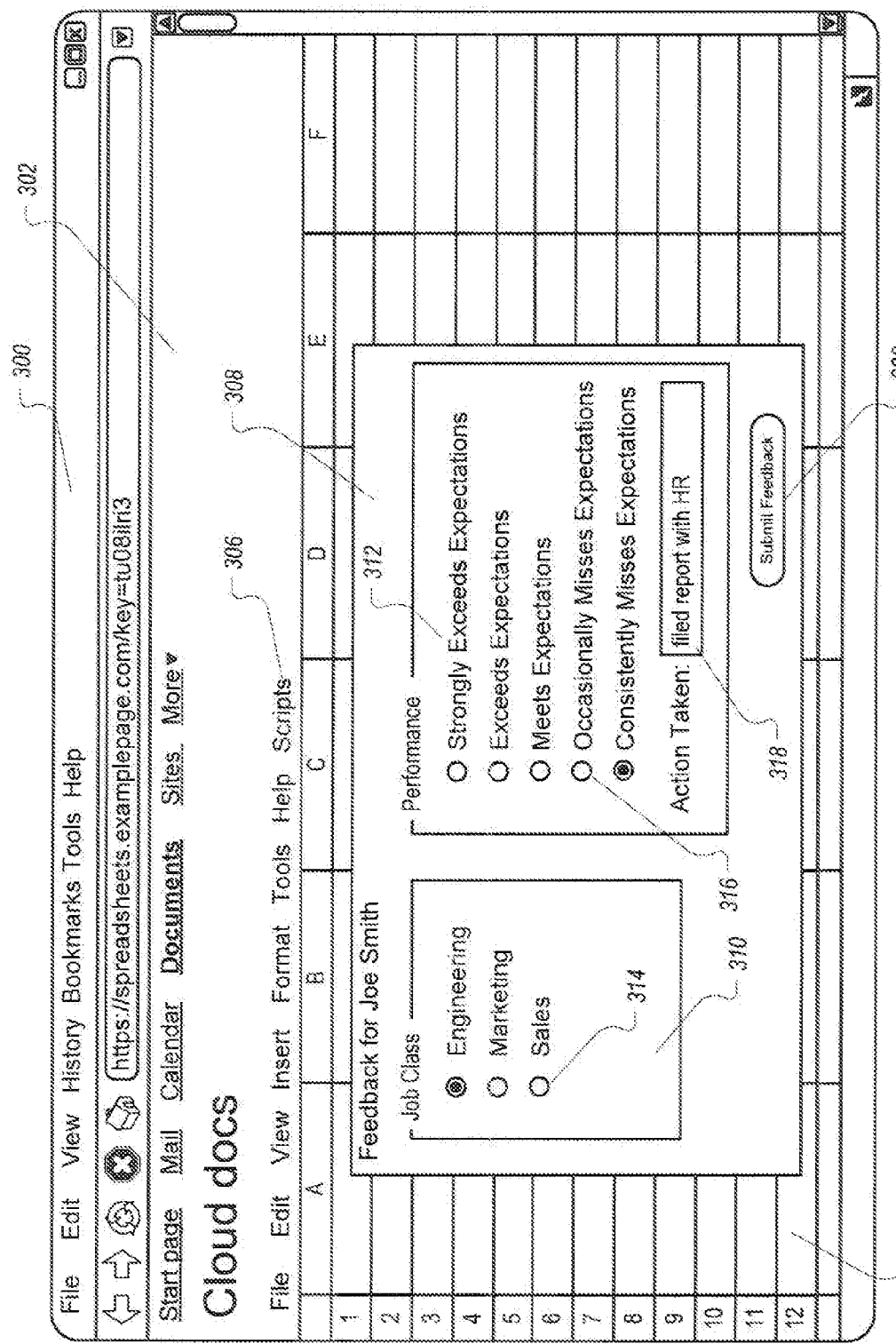
FIG. 3 is an example browser including a user interface rendered in association with a script.

Referring now to FIG. 3, a browser 300 displays a spreadsheet application 302. The browser 300 can be displayed by a client device (e.g., a personal computer, mobile device, etc.) in communication with a hosted computer system. In some implementations, the client device can make a call to a spreadsheet server in order to receive a spreadsheet 304 displayed by the spreadsheet application 302.

A script (e.g. macro) can be executed in association with the spreadsheet application 302. For example, a script can be triggered upon detection of a specified event (e.g., an e-mail is received, or a spreadsheet cell is selected) as described in greater detail above. In some implementations, a user can select a script control 306 in order to cause a menu of one or more scripts that are associated with the spreadsheet application 302 to be displayed. The user can select a script from the menu in order to cause the script to be executed. The client device can access script code stored on a hosted computer system. The script code can be provided to the client device and executed by the client device, for example, through the use of a script controller (e.g., the macro controller 226b of FIG. 2). In some implementations, script code is executed by the hosted computer system and the results the script code execution are provided to the client device displaying the spreadsheet application 302.

In some implementations, the script can include methods that when executed cause a user interface 308 to be rendered. In some implementations, the user interface 308 can be rendered within the spreadsheet application 302. In some implementations, the user interface 308 can be rendered within a stand alone window that is separate from the browser 300. The methods included within the script can employ familiar, high level, strongly typed programmatic objects in order to allow a programmer to define a user interface having a flexible layout that can be rendered by a variety of output devices. The user interfaces can have flexible layouts in order to allow the user interfaces to be rendered on a variety of different user devices, such as smart phones, personal computers, web enabled TVs, etc.

For example, referring to the user interface 308 depicted in FIG. 3, when a user's JavaScript code executes var app=UiApp.createApplication( ).setTitle('Feed-
    back for Joe Smith');     (3)

the user interface 308 is created with the title "Feedback for Joe Smith." Additionally, the user's JavaScript code can include methods for creating caption panels within the user interface 308. For example, the user's JavaScript code can execute var cp=app.createCaptionPanel('Job Class');     (4)

in order to create a caption panel 310 labeled "Job Class." An additional caption panel 312 having a label "Performance" can be created, for example, by executing JavaScript code, such as var cp2=app.createCaptionPanel('Performance');     (5)

The caption panels 310 and 312 can be rendered in various positions with relation to each other depending on the device on which they are rendered. In the example shown in FIG. 3, the caption panel 312 is positioned to the right of the caption panel 310. On a device on which horizontal space is limited (e.g., a mobile phone) the caption panel 312 can be rendered below the caption panel 310 within the user interface 308. In some implementations, a user can specify the sizes of the user interface 308 and the caption panels 310 and 312 as well as the positions of the caption panels 310 and 312 within the script.

The caption panels 310 and 312 as well as other areas of the user interface 308 can be populated with additional user interface elements, such as buttons, check boxes, text, graphics, text boxes, various controls, and other elements. In the example shown, the caption panel 310 is populated with radio buttons 314 as well as text associated with each of the radio buttons 314. The radio buttons 314 and associated text can be created, for example, by executing JavaScript code, such as radioPane.add(app.createRadioButton('division',
    'Engineering'))

radioPane.add(app.createRadioButton('division',
    'Marketing'));

radioPane.add(app.createRadioButton('division',
    'Sales'));     (6)

The above code can create radio buttons corresponding to divisions of "Engineering," "Marketing," and "Sales." The caption panel 312 can additionally be populated with radio buttons 316 and text associated with each of the radio buttons 316. The radio buttons 316 and associated text can be created, for example, by executing JavaScript code, such as radioPane.add(app.createRadioButton('perf',
        'Strongly Exceeds Expectations'));

radioPane.add(app.createRadioButton('perf',
        'Exceeds Expectations'));

radioPane.add(app.createRadioButton('perf', 'Meets
        Expectations'));

radioPane.add(app.createRadioButton('perf', 'Occa-
        sionally Misses Expectations'));

radioPane.add(app.createRadioButton('perf', 'Consis-
        tently Misses Expectations').addClickHandler
        (perfHandler));    (7)

As described above, callbacks can be defined for known events. For example, when one of the radio buttons 314 or the radio buttons 316 is selected, a callback to a hosted computing system can be made. A script server can receive the callback and provide commands to the client system in response to the selection of a radio button. In some implementations, the provided commands can cause the user interface 308 to be modified.

For example, the user interface 308 can be displayed in a first instance in which a text box 318 (as well as text associated with the text box 318) is not initially displayed within the caption panel 312. A user can then select a radio button 316 corresponding to "Consistently Misses Expectations." Selection of the radio button can cause the script associated with the user interface 308 to perform a callback. The callback can be to a hosted computing system or other remote system. The additional commands can be returned in response to the selection of the radio button to cause the text box 318 to be displayed within the caption panel 312. In some implementations, the callback can cause a method which causes the display of the text box 318 to be executed.

For example, the following JavaScript code can be executed prior to the code segment (7) above var perfHandler=app.createServerClickHandler('up-
        datePerf');    (8)

which can cause a method "updatePerf" to be executed in response to a user selection of the radio button 316 corresponding to "Consistently Misses Expectations." The method "updatePerf" can cause the text box 318 to be "unhidden" or otherwise displayed within the user interface 308.

The user can then fill information into the text box 318. For example, the user can enter "filed report with HR" to indicate an action taken in association with Joe Smith consistently missing expectations. The user interface 308 can include a user selectable control 320 that can be selected by the user to submit the information entered using the user interface 308.

The script associated with the user interface 308 can perform actions using the entered information. For example, the script can populate cells of the spreadsheet 304 with the entered information. The script can, for example, enter the value "Joe Smith" in cell A1, the value "Engineering" in cell A2, the value "Consistently Misses Expectations" in cell A3, and the value "filed report with HR" in cell A4.

As another example, the script can cause a communication (e.g., an email) to be initiated. The recipient of the communication can be identified based on information entered into the user interface 308. For example, if the radio button 314 associated with "Engineering" is selected, the script can cause an email to be sent to a manager of the engineering team when the control 320 is selected while if the radio button 314 associated with "Sales" is selected, the script can cause an email to be sent to a manager of the sales team when the control 320 is selected. The email can include the information entered into the user interface 308 as well as other information (e.g., information associated with Joe Smith that is drawn from the spreadsheet 304).

In some implementations, the positions of element included in a user interface (such as the user interface 308) can be defined using a grid system. For example, a grid system can be defined by executing the following JavaScript code var formContent=app.createGrid( ).resize(4,2);    (9)

The grid defined by the above code segment can be four positions tall by two positions wide. The script can further define elements to place in each of the grid positions. For example, executing the JavaScript code formContent.setWidget(0, 1, app.createTextBox( ).set-
        Name('txt'));    (10)

can cause a text box to be included in a user interface and positioned in the top row in the second column (the first column being column 0). Allowing a programmer to define the positions of elements within a user interface can allow the programmer greater control over the appearance and orientation of various user interface elements.

In some implementations, user interface elements are provided to the author of a script in the form of executable commands included within a scripting language. For example, the scripting language can included commands such as "createRadioButton," "createCaptionPanel," or other commands such as those described above. The author can select user interface elements to include in a user interface generated from a script code segment by entering user interface element commands included within the scripting language (e.g., UI commands recognized by a compiler for the scripting language). By entering user interface element commands, the author is selecting user interface elements from the group of user interface elements included in the scripting language.

In some implementations, user interface elements can be provided to the author of a script in the form of a user selectable menu. For example, user interface elements such as dialog boxes, buttons, radio buttons, TextArea objects, user interface layout definitions, and forms can be displayed in a menu. The author can select one or more the user interface elements in order to cause the user interface elements to be included in a user interface rendered from a segment of script code. For example, a code segment can be associated with a selected user interface element. Selection of the user interface element can cause the associated code segment to be inserted into a script.

In some implementations, a user can design a user interface in association with a script using a "gui painter" or other such program that can allow the user to design a user interface for the script using a graphical user interface. For example, the gui painter can allow the user to identify a size and shape of a user interface. The user can then select user interface elements from a menu of potential user interface elements and "drag and drop" the user interface elements into the user interface. The user can then provide text to include in the user interface as well as text to associate with various user interface elements, such as radio buttons, check boxes, text boxes, and other various controls. In some implementations, the user can include graphics or imported images in a user interface. The gui painter can generate code that can render a user interface designed by the user when a script is executed.

Figure 4:
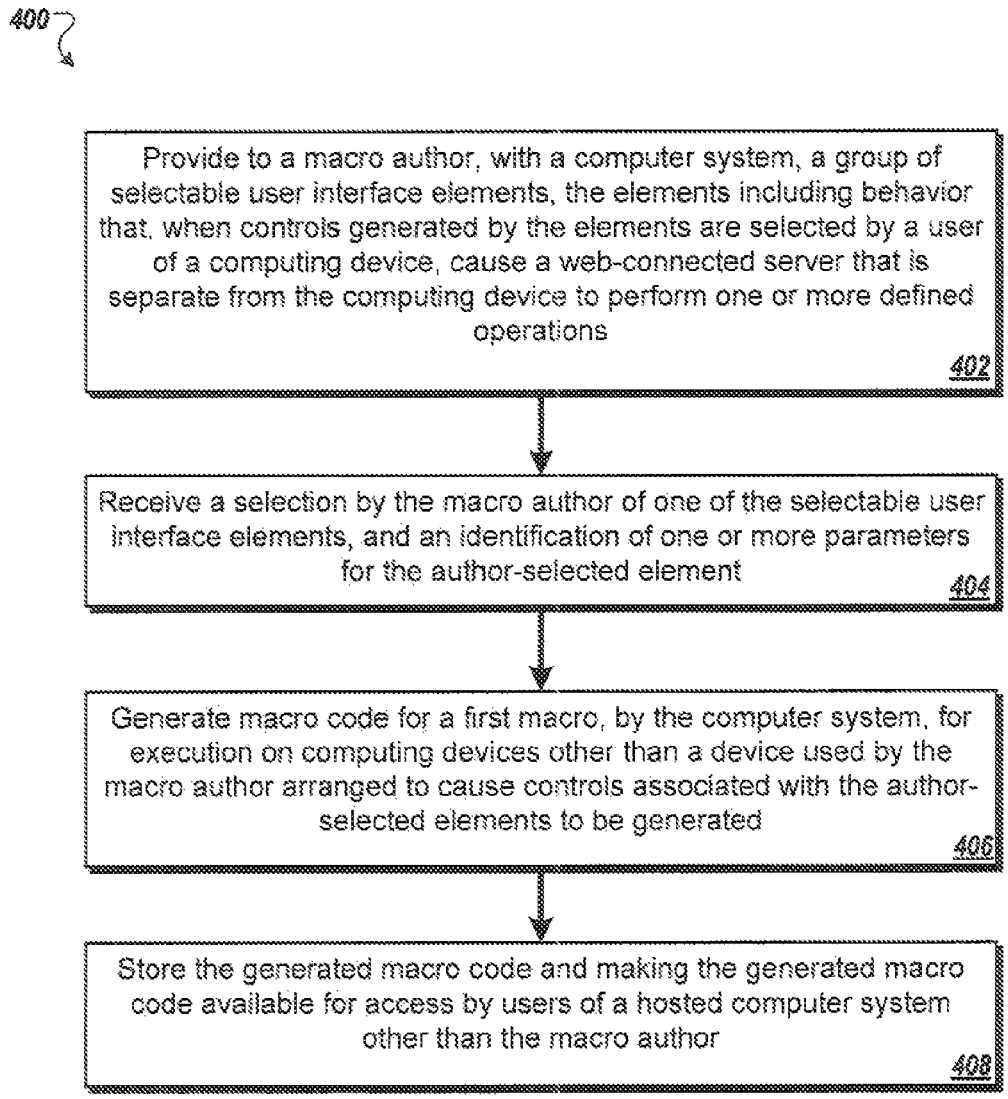
FIG. 4 is a flow chart of a process for executing a script for providing a user interface on a hosted computing system.

FIG. 4 is a flow chart of a process 400 for executing a script for providing a user interface on a hosted computing system. The process 400 may be used, for instance, for running scripts in the systems 100 and 200. In general, the pictured process involves providing user interface elements to a user of a hosted computer system, receiving selection of user interface elements from the user, generating macro code to cause controls associated with the selected user interface elements to be generated, and storing the generated macro code in a hosted computer system and making the macro code available to other users.

The process 400 in this example begins at box 402, where a group of selectable user interface elements are provided to a macro author with a computer system. The elements include behavior that, when controls generated by the elements are selected by a user of a computing device, cause a web-connected server that is separate from the computing device to perform one or more defined operations. For example, a user interface element for a submission button can be selected by the author. A submission button control can be generated by the selected user interface element. When a user (either the author, or a different user) selects the submission control button, a web-connected server that is separate from the computing device can cause information submitted by the user to be transmitted as part of a communication, or added to a file (e.g., by populating fields in a spread sheet).

In some implementations, the user interface elements are provided to the macro author in the form of user interface commands defined by a scripting language. In some implementations, a menu of user interface elements can be provided to the macro author. In some implementations, the menu can include graphic representations of various user interface elements. In some implementations, provided user interface elements can be associated with script code segments.

At box 404, a selection by the macro author of one of the selectable user interface elements is received, and an identification of one or more parameters for the author-selected element is received. For example, a selection of a user interface element can be received in the form of the macro author typing a user interface element command defined by a scripting language into a script code segment. As another example, the macro author can use a cursor to select a user interface element from a menu of user interface elements.

The macro author can enter parameters in association with the selected user interface element. For example, the author can include a user interface element command in a code segment to indicate that a radio control should be included in a user interface. The author can then indicate a caption parameter of "consistently misses expectations" for the radio control button. As another example, a macro author can enter height and width parameters for a caption panel user interface element. As yet another example, when the macro author selects a user interface element from a user interface element menu, a system can prompt the macro author to enter a caption or other parameter in association with the selected user interface element.

At box 406, macro code for a first macro is generated, by the computer system, for execution on computing devices other than a device used by the macro author arranged to cause controls associated with the author-selected elements to be generated. For example, executable code can be generated. The executable code can be configured to be executable on computing devices that are distinct from the computing device used by the macro author to generate the macro code. Execution of the code can cause various user interface elements, including controls, such as radio buttons, text boxes, selection buttons and the like to be displayed to a user.

At box 408, the generated macro code is stored and made available for access by users of a hosted computer system other than the macro author. For example, users can access the macro code from remote computing devices that are distinct from the hosted computer system. In some implementations, the macro author can define parameters by which users can access the macro code. For example, the macro author can indicate user IDs associated with user accounts of users who are permitted to access the macro code. As another example, the macro author can indicate one or more user groups. Members of the indicated user groups can be allowed to access the macro code.

Requests to execute the macro code can be received from a plurality of different applications running on a plurality of different client computers remote from the hosted computer system. For example, a first remote computer can be running a spreadsheet application and send a request to the host system for execution of the macro code in association with the spreadsheet application while a second remote computer can be running a word processing application and send a second request to the host system for execution of the macro code in association with the word processing application. The macro code can be automatically executed on the hosted computer system for each of the requests, and results of executing the macro code can be provided to each respective application of the plurality of applications in response to executing the macro.

In this manner, a macro may be executed on a central system across multiple applications that are run on separate sub-systems in the system. The macro may include security mechanisms, and may be triggered in a variety of manners. The macro may provide a graphic user interface including author selected user interface elements to users. In addition, the macro may obtain information from a variety of different services that are accessible within the system or from other systems over a network such as the Internet.

Figure 5:
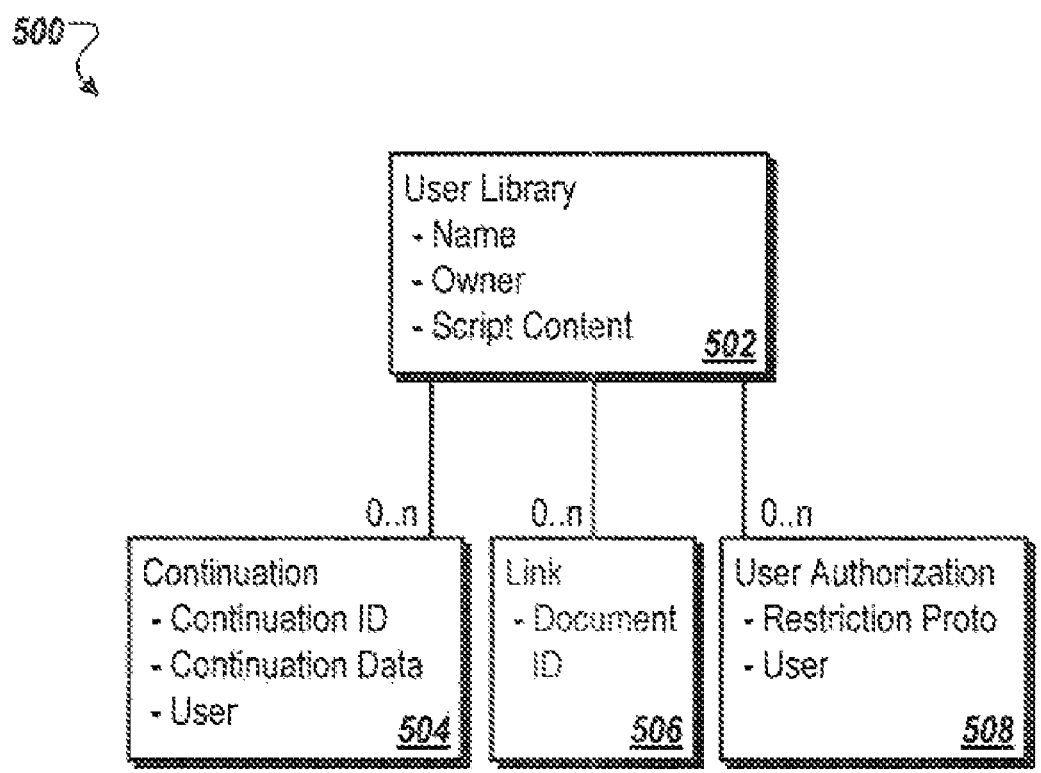
FIG. 5 shows an example structure for objects in a macro system.

FIG. 5 shows an example structure for objects in a macro system, specifically an example logical structure for information in structure such as the script information repository 206 in FIG. 2. The logical structure 500 is represented by nodes 502 through 508. For any one macro stored in the script information repository 206, for example, there may be at least one structure 500 or portions thereof. Continuation nodes 504, link nodes 506, and user authorization nodes 508 all have a 0 . . . N relationship to the user library node 502, meaning that for each user library (or header) node there may be any number of (including zero) continuations, links and user authorizations.

The root node of the structure is the user library node 502, which defines, for example, the name of the macro and/or library (e.g., "Macro_XYZ" in "Dan's Cloud-based MacroLib"), the macro library's owner (e.g., "Dan"), and the script (e.g., macro code) associated with the macro. Each macro library may have a unique identifier, such as a 64-bit pseudo-random number, which may also serve as a database primary key. In some implementations, fields such as the library name and the set of functions contained within the library are not used when retrieving a macro from the database; they are strictly for use when running/displaying the macro library. The "owner" field may be used, for example, as a foreign key with operations such as "get all macros owned by user XYZ." The link table may be used, for instance, with operations such as "get all macros used by document XYZ."

The continuation node 504 may include a continuation ID, continuation data (e.g., from additional entry points, such as for resuming the macro with additional inputs after the macro has gone into a wait state), and a user name (e.g., the user who created the continuation node 504). Multiple continuation nodes 504 may exist for a given macro. The "owner" of a continuation may be recorded primarily to prevent session hijacking so that, for example, user X cannot resume a macro that had been running as user Y. In this way, operations may ensure that only user Y can resume a macro which they initiated. Multiple such records may be allowed because one user may have several continuations (e.g., three open spreadsheets in separate windows, each with an active prompting dialog box). Multiple users may also be simultaneously running their own instance of a macro, each with their own dialog prompt.

The link node 504 permits outside entities to link to the macro. The link node 504 may include a document ID, which may be the URL or some other path name that "points to" the macro. Multiple link nodes 506 may exist, as there may be several different names for (and several different URL paths or other paths to) the same macro.

The user authorization node 508 may contain information that allows restricted access to the macro. For example, a restriction protobuffer field may control access using a protocol pattern of value, while a user field may control access based on a user ID. Either or both may be used in each node 508. Multiple user authorization nodes 508 may exist for a given macro, each one identifying a different authorization level. The user authorization node 508 may enforce the existence of only one authorization record per user, per macro. The enforcement may employ a representation of the user's stamp of approval for their execution of that macro, and the things that the macro may do. Multiple records may be allowed only because multiple different users may have each authorized the macro, and each may have authorized different actions for it to execute. When user X executes a macro, their authorization record for that macro is pulled up; all others are ignored.

If the requirements for a macro change (e.g., if the author adds a call to Blogger) which alters the requirements that the macro needs to run, the existing user authorizations may be marked as invalid. As a result, when a user tries to re-execute the macro after the additional requirement was added, they may be re-prompted for authorization. For example, the prompt may say "this macro requires access to Calendar and Blogger", where previously the macro may have simply said "this macro requires access to Calendar". Prompting may not be needed for re-authorization if services are deleted; only if the requirements increase.

Figure 6:
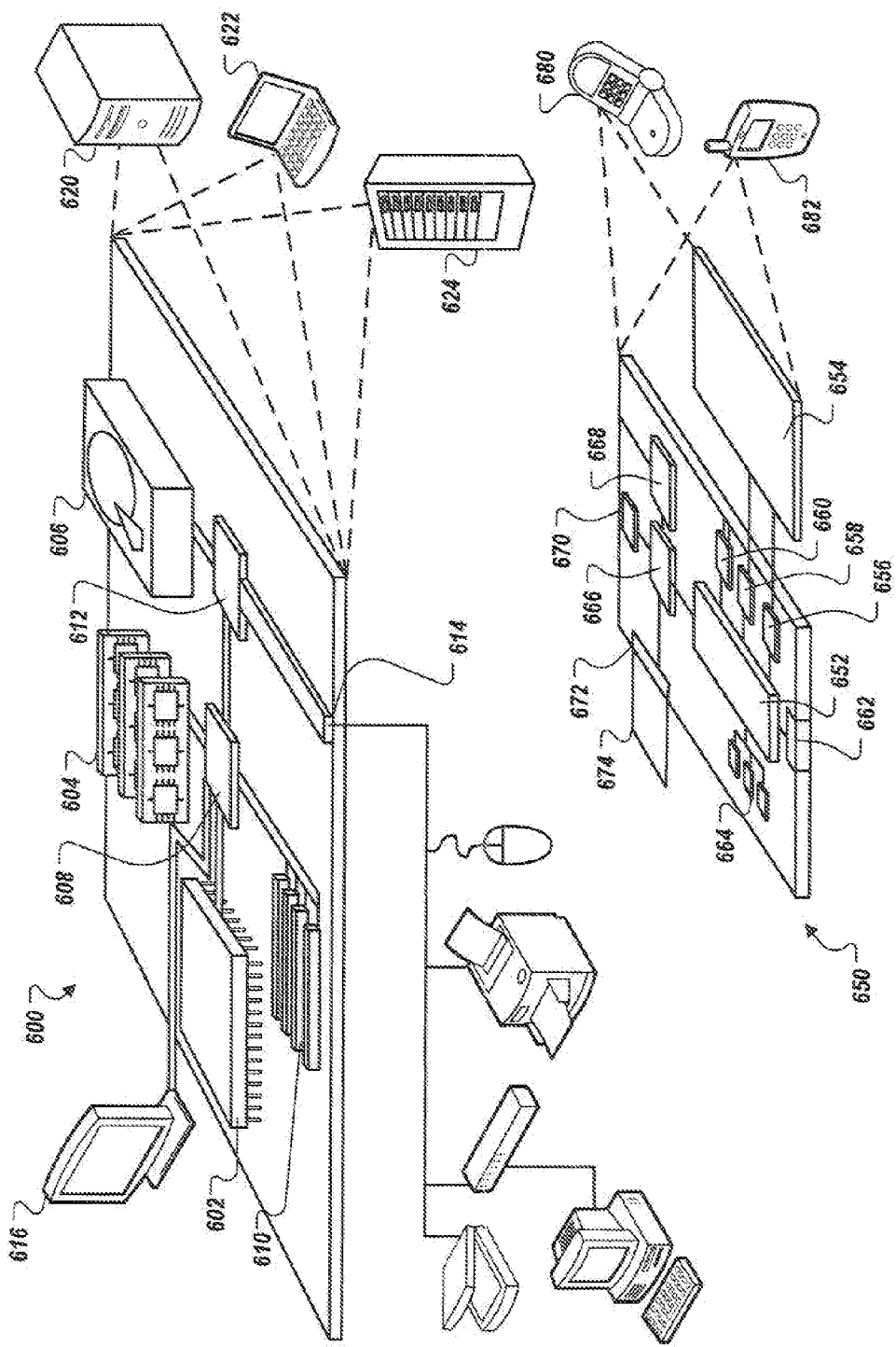
FIG. 6 shows examples of generic computer devices that can be used to execute the actions discussed in this document.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652,

664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Device 650 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 650 and used to update the display of the respective devices 650 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular types of macros, but other forms of macros and approaches to the execution and record of macros may also be addressed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method of managing computer macros, the method comprising:
   storing macro code at a location in an internet-accessible hosted computer system;
   monitoring, by the hosted computer system, for an event that triggers invocation of the macro code;
   executing the macro code on the hosted computer system in response to occurrence of the event; and
   providing results of executing the macro code to an application that is running on a client device remote from the hosted computer system,
   wherein the macro code is stored and accessed apart from files on which the macro code is programmed to operate, and
   wherein the event that triggers invocation of the macro code occurs independently of whether a user is interacting with the application that is addressed by the macro code;
   tracking, by the hosted computer system, particular events for a plurality of users registered in the hosted computer system;
   executing the macro code upon occurrence of one of the particular events associated with a particular one of the users; and
   providing results of the macro code to an application that is running on a client device associated with the particular one of the users.

2. The computer-implemented method of claim 1 including correlating, in the hosted computer system, detection of the event with execution of the macro code.

3. The computer-implemented method of claim 1 including providing results of the macro code to applications that are running on client devices associated with other ones of the users.

4. The computer-implemented method of claim 1 wherein the event includes receiving an email message, a-text message, a blog entry or an incoming RSS feed.

5. The computer-implemented method of claim 1 wherein executing the macro code on the hosted computer system occurs only if one or more previously established conditions associated with the event are satisfied.

6. The computer-implemented method of claim 1 wherein executing the macro code on the hosted computer system occurs only if a combination of conditions based on information from a plurality of sources are satisfied.

7. The method of claim 1, wherein the event is information obtained from a third-party source over the internet.

8. A computer-implemented system for executing macros on a hosted computer system, comprising:
   a hosted computer system with one or more computers, comprising:
   a macro data store storing a plurality of macros each of which is assigned to a respective user account on the hosted computer system and each of which defines a series of actions to be executed by at least one of a plurality of hosted applications, wherein access to the plurality of macros is defined so as to identify user accounts on behalf of which the system will execute each of the plurality of macros;
   an event handler to monitor for events that trigger invocation of one of the macros; and
   a computer server programmed to run a script manager that accesses and executes a particular one of the macros in response to occurrence of a particular one of the events, the computer server further programmed to provide results of executing the macro to an application that is running on a client device remote from the hosted computer system;
   wherein the event that triggers invocation of the macro code occurs independently of whether a user is interacting with the application that is addressed by the particular macro;
   wherein the event handler tracks particular events for a plurality of users registered with the event handler;
   wherein the script manager executes a particular one of the macross upon occurrence of a particular one of the events associated with a particular one of the users; and
   wherein the computer server is programmed to provide results of the macro executed by the script manager to an application that is running on a client device associated with the particular one of the users.

9. The computer-implemented system of claim 8 wherein the computer server is programmed to provide results of the macro to applications that are running on client devices associated with other ones of the users.

10. The computer-implemented system of claim 8 wherein the event handler monitors events that include receiving at least one of the following: email messages, text messages, blog entries or incoming RSS feeds.

11. The computer-implemented system of claim 8 wherein the script manager executes the particular macro only if one or more previously established conditions associated with the particular event are satisfied.

12. The computer-implemented system of claim 8 wherein the script manager executes the particular macro only if a combination of conditions based on information from a plurality of sources are satisfied.

13. The system of claim 8, wherein the event is information obtained from a third-party source over the internet.

14. One or more tangible, non-transitory and computer-readable media having recorded thereon instructions that, when executed by one or more computers, perform operations comprising:

storing macro code at a location in an internet-accessible hosted computer system;

monitoring, by the hosted computer system, for an event that triggers invocation of the macro code executing the macro code in response to occurrence of the event; and providing results of executing the macro code to an application that is running on a remote client device, wherein the macro code is stored and accessed apart from files on which the macro code is programmed to operate, and wherein the event that triggers invocation of the macro, code occurs independently of whether a user is interacting with the application that is addressed by the macro code.

tracking, by the hosted computer system, particular events for a plurality of users registered in the hosted computer system;

executing the macro code upon occurrence of one of the particular events associated with a particular one of the users; and providing results of the macro code to an application that is running on a client device associated with the particular one of the users.

15. The tangible, non-transitory and computer-readable media of claim 14 wherein the operations include correlating detection of the event with execution of the macro code.

16. The tangible, non-transitory and computer-readable media of claim 14 wherein the operations include providing results of the macro code to applications that are running on remote client devices associated with other ones of the users.

17. The tangible, non-transitory and computer-readable media of claim 14 wherein the event includes receiving an email message, a text message, a blog entry or an incoming RSS feed.

18. The tangible, non-transitory and computer-readable media of claim 14 wherein the operations include executing the macro code only if one or more previously established conditions associated with the event are satisfied.

19. The tangible, non-transitory and computer-readable media of claim 14 wherein the operations include executing the macro code only if a combination of conditions based on information from a plurality of sources are satisfied.

20. The computer-readable media of claim 14, wherein the event is information obtained from a third-party source over the internet.

* * * * *